United States Patent [19]

Garner et al.

[11] Patent Number: 5,490,689

[45] Date of Patent: Feb. 13, 1996

[54] REACTION CAN TO COVER JOINING METHOD

[75] Inventors: Brett R. Garner, South Weber; Russell P. Lee, Ogden, both of Utah

[73] Assignee: Morton International, Inc., Chicago, Ill.

[21] Appl. No.: 369,199

[22] Filed: Jan. 5, 1995

[51] Int. Cl.$^6$ ................................................ B60R 21/16
[52] U.S. Cl. ........................................ 280/728.2; 280/732
[58] Field of Search ........................... 280/728.2, 731, 280/732, 728.3

[56] References Cited

U.S. PATENT DOCUMENTS

| | | | |
|---|---|---|---|
| 4,770,439 | 9/1988 | Maier et al. | 280/728.2 |
| 4,915,410 | 4/1990 | Bachelder | 280/732 |
| 4,941,678 | 7/1990 | Lauritzen et al. | 280/732 |
| 5,145,207 | 9/1992 | Bederka et al. | 280/732 |
| 5,263,739 | 11/1993 | Webber et al. | 280/728.2 |
| 5,280,946 | 1/1994 | Adams et al. | 280/728.2 |
| 5,322,324 | 6/1994 | Hansen et al. | 280/732 |
| 5,332,256 | 7/1994 | Lauritzen et al. | 280/728.2 |
| 5,338,060 | 8/1994 | Soderquist | 280/728.2 |
| 5,351,987 | 10/1994 | Donegan et al. | 280/728.2 |
| 5,445,409 | 8/1995 | Abramczyk et al. | 280/728.2 |

Primary Examiner—Kenneth R. Rice
Attorney, Agent, or Firm—Lawrence I. Field; Gerald K. White

[57] ABSTRACT

In a passenger side air bag module assembly, a reaction can is attached and correctly positioned with reference to a module cover or chute by providing a flange on the can with apertures into which protruberences on the module cover may be inserted, thereby joining the can to the cover without the use of screws or rivets or welding.

3 Claims, 3 Drawing Sheets

REACTION CAN TO COVER JOINING METHOD

BACKGROUND OF THE INVENTION

1. Field of the Invention

This invention relates to passenger side airbag modules. More particularly it relates to the assembly of a passenger side airbag reaction can to a passenger side airbag module cover or cushion chute without the use of screws or rivets and by means which positively define the relative location of the parts being assembled.

2. Description of the Prior Art

Typical recently issued United States Patents describing air bag modules and their assembly from components include the following:

| | | |
|---|---|---|
| Lauritzen et al | U.S. Pat. No. 4,941,678 | issued July 17, 1990 |
| Webber et al | U.S. Pat. No. 5,263,739 | issued Nov. 23, 1993 |
| Hansen et al | U.S. Pat. No. 5,322,324 | issued June 21, 1994 |
| Lauritzen et al | U.S. Pat. No. 5,332,256 | issued July 26, 1994 |
| Donegan et al | U.S. Pat. No. 5,351,987 | issued Oct. 04, 1994 |

The disclosures of these patents are incorporated in this application by this reference.

In Lauritzen et al U.S. Pat. No. 4,941,678 a structure is described in which the reaction can includes a body part which is formed by extrusion and has grooves into which a cover may be snapped. End plates are attached to the can/cover by screws. The assembling of the several parts involves carefully locating them with respect to one another.

In Webber et al U.S. Pat. No. 5,263,739 a similar module is described, the assembled parts being held together by rods 32 and 34 and push nuts 24.

In Hansen et al U.S. Pat. No. 5,322,324 rivets 24 and 46 are used to fasten the individual components of the module to one another.

In Lauritzen et al U.S. Pat. No. 5,332,256 studs and nuts are utilized to secure the several parts of the module to one another.

In Donegan et al U.S. Pat. No. 5,351,987 the parts are assembled by sliding one axially of the other.

Screws and rivets are difficult to install and it is difficult to verify correct fastener engagement. Rivets and screws distribute deployment loads over a relatively small area. Slide-on covers require clearances on the ends to pass over the folded cushion and can be difficult to slide on to a canister.

It will be seen that each of the above assemblies requires the use of some sort of fastener necessitating a supply of such with consequent increase in inventory cost and space. Therefore, there is a need for a simpler and less expensive means for assembling a passenger side air bag reaction module cover or chute.

SUMMARY OF THE INVENTION

This invention consists of the manner in which a passenger airbag reaction can and a passenger airbag module cover or cushion chute are joined when the air bag module is assembled. The reaction can may be made of steel, aluminum or any other suitable material. The cover may be made of a molded polymer. A chute may also be produced from a molded polymer or steel. The mouth of the reaction can has flanges. These flanges have a number of slots which extend from the top surface of the flanges into the sides of the reaction can below the flanges. On the cover or chute there are blocks that seat in the reaction can slots on assembly. The blocks are such that they extend below the flange and outside of the can wall. These blocks have draft angles on their surfaces that enable simple assembly and provide positioning in the plane parallel to the reaction can mouth. Above the can flange is a web that runs the full length of the cover or chute sides. This web provides a hard stop on assembly. This web can be eliminated between the blocks. In that case the blocks in the bottom of the can slots provide a hard stop during assembly. These features position the cover or chute in the correct position normal to the reaction can mouth and do not allow the cover/chute to slide too far into the can. Each of the cover/chute blocks has a hole in it that runs parallel to the adjacent reaction can side wall. After the cover/chute is placed in the appropriate position in the reaction can steel rods with a slight taper in one end are pressed through the holes in bosses on the assembly sides. These rods transfer the deployment loads from the cover to the can. They also cause a tight fit between the reaction can and the cover/chute.

Another reaction can option is to bend the flange on the can all the way to the can wall, making a pocket for the joining rod. The edge of the can would still be slotted and fit up with the cover blocks in the same way.

The novelty of this invention is that it does not require screws, nuts, rivets, or welds to attach a passenger airbag module cover to a reaction can. This invention also allows the cover to be placed directly on the mouth of the can without sliding it on from one side. This cover to can attachment method also provides features that position the cover in the correct location on the can.

This invention allows a passenger airbag cover to be attached to a reaction can without the use of rivets or screws, thereby decreasing costs and minimizing quality problems. It also efficiently distributes the deployment loads across a large portion of the cover attachment walls. This invention also positions the cover both in the plane of the can mouth and normal to the plane.

OBJECTS

One object of the invention is to provide a passenger side airbag module, which does not require screws, nuts, rivets or welds for attachment of the module cover or chute to a reaction can.

Another object of the invention is to provide a passenger side air bag module in which the module may be assembled by placing the cover or chute directly on the mouth of the reaction can without sliding one part along the axis of the other part, e.g. by sliding it on from one side.

A further object of the invention is to provide a cover to can attachment in a passenger side airbag module which positions the cover in the correct location on the can.

A further object is to distribute loads when the airbag deploys, in service, over larger areas than those provided by screw or rivets.

A further object is to simplify the assembly process by avoiding the extra space required when the parts are assembled by sliding one part into the other from one end of the two parts (reaction can/cover or chute.)

Still another object of the invention is to reduce the cost of assembling a passenger side air bag module by elimination of screw, rivets, nuts and welds.

A further object of the invention is to provide means on the cover and on the reaction can which cooperate to properly position the cover/chute in the reaction can mouth.

These and other objects and advantages of the invention are pointed out with particularity in the description and claims which follow and which constitute a part of this specification.

For a better understanding of the invention, reference is made to the accompanying drawings and description in which preferred embodiments of the invention are illustrated.

BRIEF DESCRIPTION OF THE DRAWINGS

In the accompanying drawings which form a part of this specification.

DESCRIPTION OF THE PREFERRED EMBODIMENTS

Figure 1:
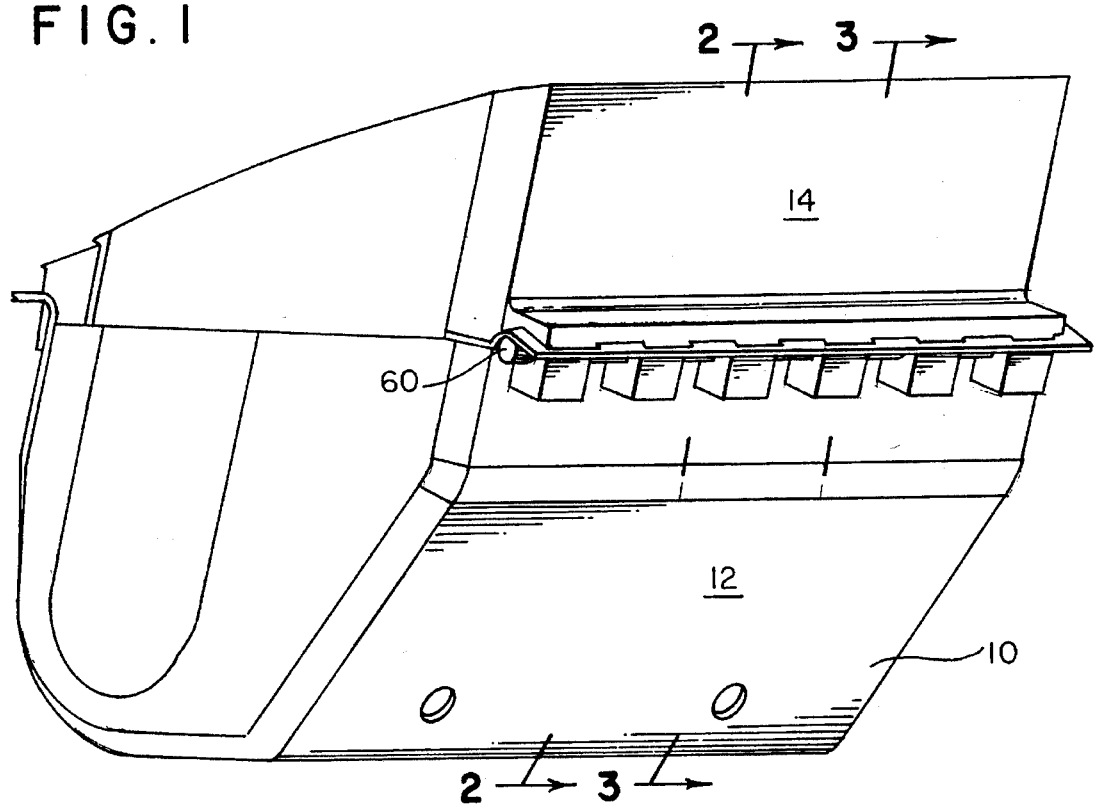
FIG. 1 is a perspective schematic view showing an assembled passenger side air bag module, according to one embodiment of the invention.
Figure 3:
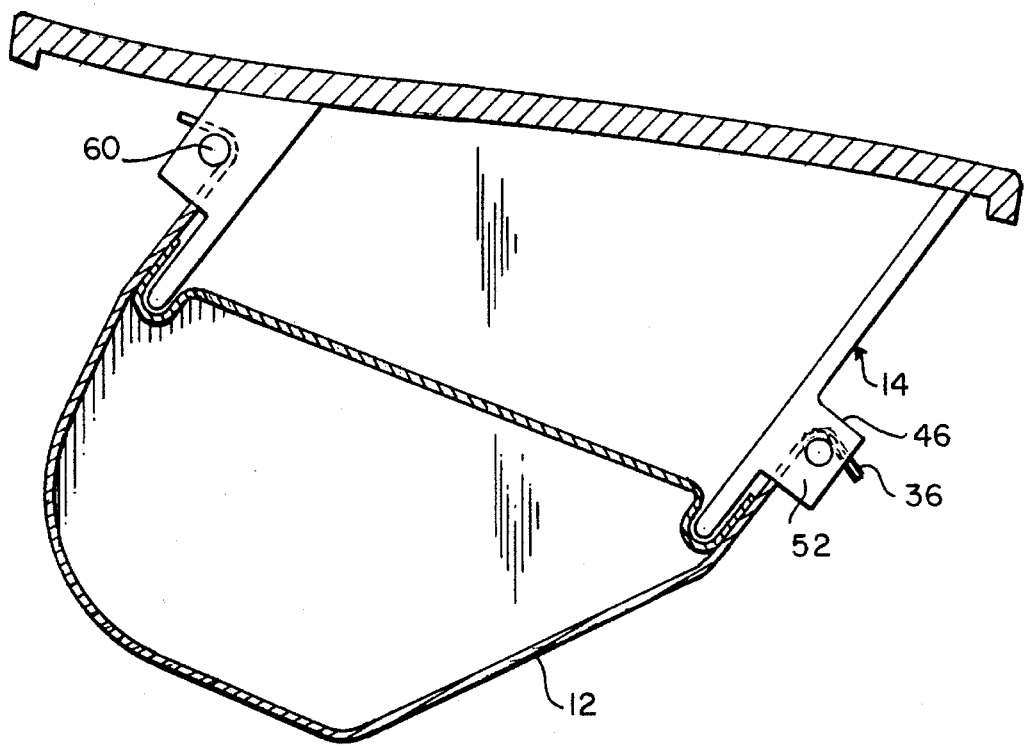
FIG. 3 is a similar view taken on plane 3—3 of FIG. 2.
Figure 2:
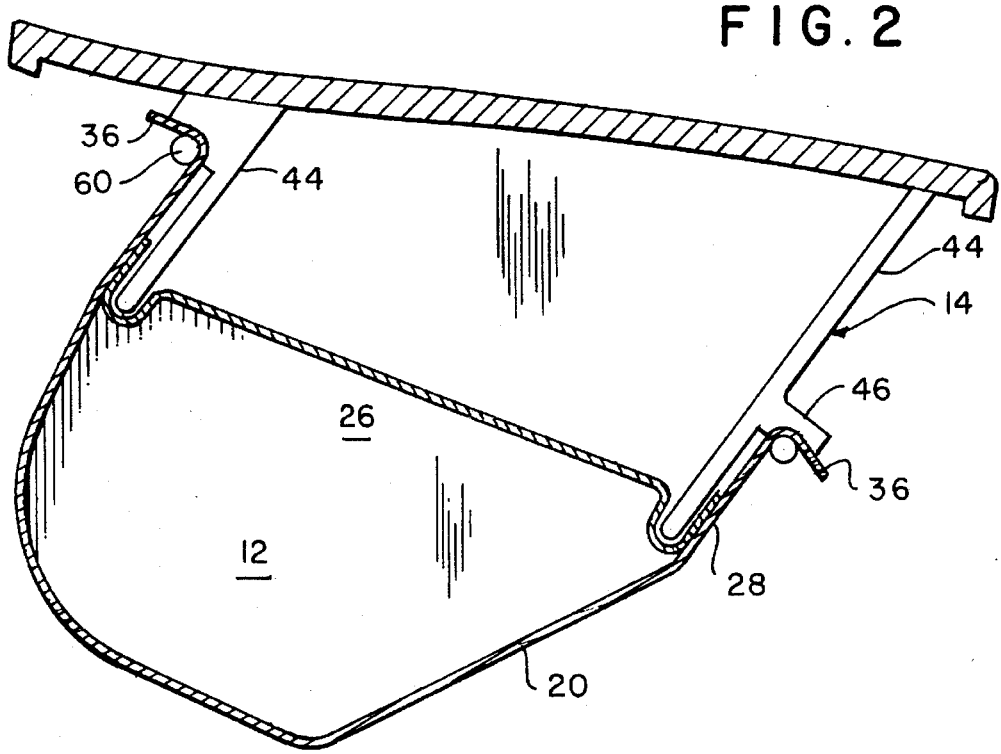
FIG. 2 is a sectional view taken on plane 2—2 of FIG. 1.

In FIG. 1, an air bag module 10 according to the present invention consists of a reaction can 12 and a module cover/chute 14 intended to be mounted in an instrument panel or dashboard on the passenger side of an automotive vehicle. The reaction canister 12 contains an inflator and a folded air bag as shown in any of the above noted patents. These components form no part of the present invention and therefore are not shown in the drawings. The manner in which the module cover 14 is attached to the reaction canister will become apparent from the fragmentary views in FIGS. 4 and 5, and the sectional views in FIGS. 2 and 3.

As seen in the Figures, the reaction canister 12 includes a housing 20 having a side wall 22 and endwalls 24, which extend upwardly to define a mouth 26. The sidewalls 22 extend beyond the upper edge 28 of the endwalls. Extensions 30 in the upwardly extending sidewalls 22 are slotted, e.g. by punching or cutting suitably shaped openings 32 adjacent to the upper edge or rim 34 of sidewall 22. The extension 30 is bent to form a flange 36 on opposite sides of the mouth 26 of canister 12.

Cover/chute comprises two sidewalls 42 and two endwalls 44 with the four walls defining a shape 46 complimentary to the shape of can mouth 26.

Figure 4:
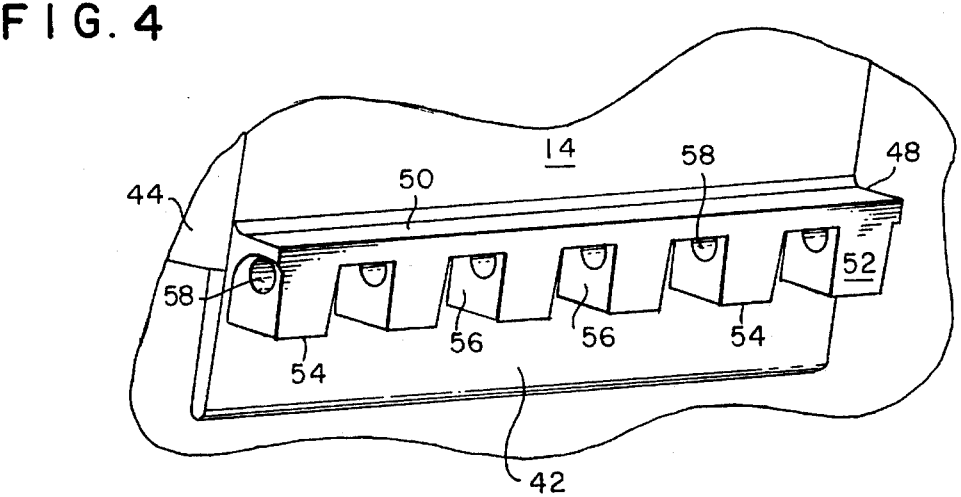
FIGS. 4 and 5 are fragmentary views in perspective showing details of the cover/chute and reaction can, respectively.
Figure 5:
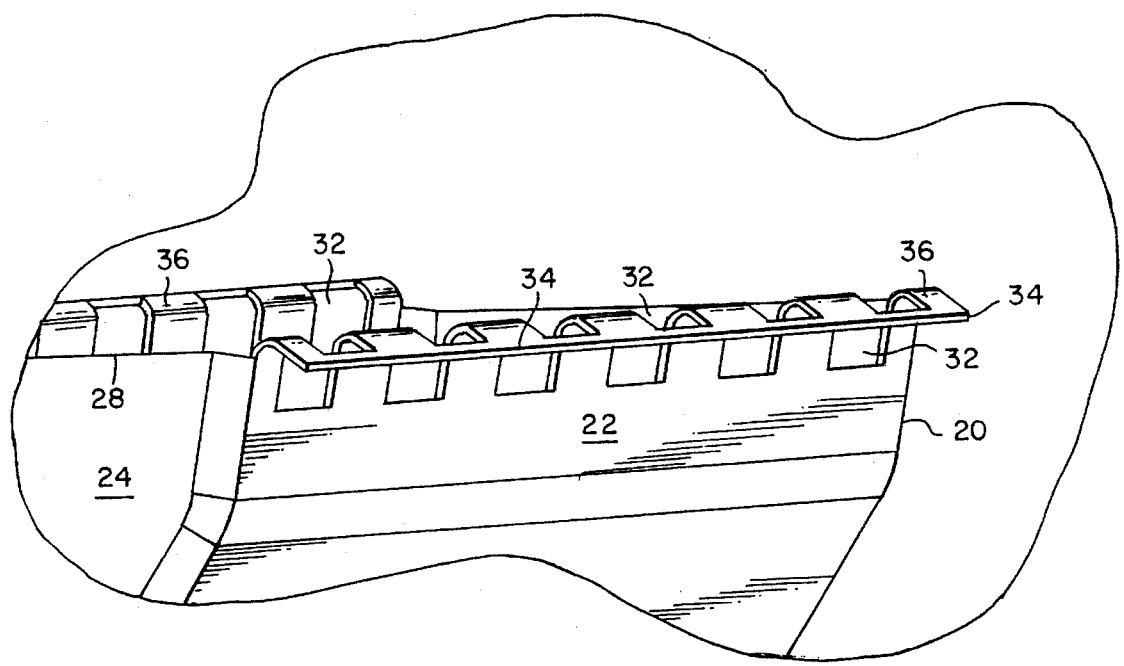

Integral with sidewalls 42 are webs 48 shown in FIG. 4. Webs 46 have an upper surface 50, substantially normal to the sidewalls 42 from which they protrude. Depending from the lower portion of the web 46 are blocks 52. Each block 52 has a generally square bottom 54 and sides 56 extending between bottom 54 and web 48. A bore 58 extends through each individual block 52, below web 48 and parallel to it.

The upper edge of each sidewall 22 is bent over to form flange 36 on reaction can. The recesses 32 in flange 36 are adapted to receive blocks 52. Blocks 52 are provided with draft surfaces or tapers to facilitate their insertion into recesses 32.

It will be appreciated that the combinations of blocks 52 and recesses 32 locate the cover/chute 14 with reference to the reaction can 12. After the two have been assembled, a tapered rod 60 may be inserted into bores 58 in the cover blocks, securing the cover 14 to reaction can 12.

Figure 6:
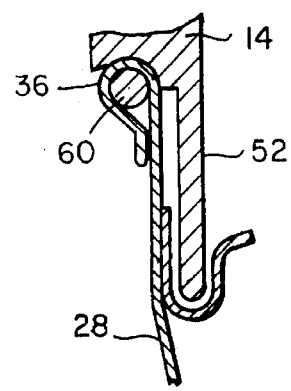
FIG. 6 is a fragmentary sectional view of a second embodiment showing another connection between the cover and can in the assembled air bag module.

In an alternative embodiment, can flange 36 may be bent so as to further confine rod 60, as shown in FIG. 6 supplementing the cooperation between rod 60 and bores 58.

Having now described preferred embodiments of the invention it is not intended that it be limited except as may be required by the appended claims.

We claim:

1. In a passenger side airbag module assembly consisting of a reaction can and a cover or chute adapted to be installed into an automotive vehicle, the improvement which comprises:

a reaction canister having walls which terminate in an open mouth, said walls including two planar sidewalls and two planar endwalls, said sidewalls extending beyond the extremity of said endwalls, each of said sidewalls being bent to form a flange substantially normal to the planar portions of said sidewalls, thereby defining a flange extending outwardly from the mouth of said canister, apertures provided in portions of said sidewalls adjacent to the mouth of said canister, a module cover or chute having an inner end adapted to be installed in a recess in the dashboard of said vehicle and an outer end adapted to be inserted into the mouth of said canister; said cover or chute including two endwalls and two sidewalls, a web on an exterior surface of each of said sidewalls adjacent to the outer end of said cover/chute and integral with said sidewalls, blocks integral with said web and depending from said web, said blocks being shaped to be inserted into the apertured in the flanges of said reaction canister, and bores extending transversely through said blocks and a rod inserted through said bores to secure said blocks to said reaction canister, whereby said cover/chute may be assembled to said reaction canister without the use of screws, rivets, nuts, or welding and whereby the load during deployment of an airbag in said canister is distributed over a wide area defined by said reaction canister flange and said cover/chute web.

2. The invention of claim 1 including draft surfaces on said blocks to facilitate insertion of said blocks into said apertures.

3. The invention of claim 1 including a bent portion of said canister flange, partially encircling said rod.

* * * * *